(12) United States Patent
Lee

(10) Patent No.: US 7,609,421 B2
(45) Date of Patent: Oct. 27, 2009

(54) SCANNING APPARATUS

(75) Inventor: Ta-Yi Lee, Chung-Ho (TW)

(73) Assignee: Lite-On Technology Corporation, Taipei (TW)

( * ) Notice: Subject to any disclaimer, the term of this patent is extended or adjusted under 35 U.S.C. 154(b) by 102 days.

(21) Appl. No.: 11/898,380

(22) Filed: Sep. 12, 2007

(65) Prior Publication Data
US 2008/0174835 A1 Jul. 24, 2008

(30) Foreign Application Priority Data
Jan. 24, 2007 (TW) .............................. 96201419 U

(51) Int. Cl.
*H04N 1/04* (2006.01)
(52) U.S. Cl. ................ 358/475; 358/482; 358/483; 358/474; 250/208.1
(58) Field of Classification Search ................ 358/475, 358/509, 483, 482, 497, 474, 484; 250/208.1, 250/216, 239, 234–236, 203.2, 205; 355/67, 355/68; 362/84, 245, 611–613, 615
See application file for complete search history.

(56) References Cited
U.S. PATENT DOCUMENTS

| 6,236,470 | B1* | 5/2001 | Seachman | 358/471 |
|---|---|---|---|---|
| 7,414,762 | B2* | 8/2008 | Poletto | 358/496 |
| 2003/0006362 | A1* | 1/2003 | Lee et al. | 250/208.1 |
| 2004/0080797 | A1* | 4/2004 | Lee | 358/509 |
| 2005/0200916 | A1* | 9/2005 | Lee et al. | 358/474 |
| 2007/0019256 | A1* | 1/2007 | Matsui et al. | 358/509 |
| 2008/0118276 | A1* | 5/2008 | Ito et al. | 399/211 |
| 2008/0180907 | A1* | 7/2008 | Lee | 361/690 |
| 2008/0291514 | A1* | 11/2008 | Lin et al. | 358/509 |

FOREIGN PATENT DOCUMENTS

| TW | 518877 | 1/2003 |
|---|---|---|
| TW | 549768 | 8/2003 |
| TW | 253840 | 12/2004 |

\* cited by examiner

*Primary Examiner*—Cheukfan Lee
(74) *Attorney, Agent, or Firm*—Rosenberg, Klein & Lee

(57) ABSTRACT

A scanning apparatus for scanning an image of a document includes a housing, a reflecting plate, a light emitting element having a substrate and a plurality of point light sources, and an image sensor. The housing has a slit formed on a top surface thereof. The reflecting plate is disposed in the housing, extends on an edge of the slit, and faces the slit. The substrate is fixed on an edge of the reflecting plate, and the point light sources are fixed on the substrate. Each point light source emits a scanning light to the reflecting plate, and the scanning light is reflected onto the document through the slit. The scanning light is reflected by the document to form an image light that enters the housing through the slit. The image sensor is disposed in the housing for receiving the image light and converting image light into image data.

12 Claims, 8 Drawing Sheets

SCANNING APPARATUS

CROSS-REFERENCE TO RELATED APPLICATIONS

This non-provisional application claims priority under 35 U.S.C. §119(a) on Patent Application No(s). 096201419 filed in Taiwan, R.O.C. on Jan. 24, 2007, the entire contents of which are hereby incorporated by reference.

BACKGROUND OF THE INVENTION

1. Field of Invention

The present invention relates to a scanning apparatus, more particularly to a scanning apparatus having a plurality of point light sources to emit a scanning light.

2. Related Art

A scanning apparatus includes an image sensor, a light emitting element, and optical elements. The optical elements are provided for reflecting, refracting, or focusing light, so as to change a light path of the light and focus the light in a specific area. The light emitting element is provided for emitting a scanning light onto a document. The scanning light is reflected by the document to form an image light that is then received by the image sensor and converted into image data.

As the image sensor receives the image light and then convert it into the image data, the spectrum and intensity of the light emitted by the light emitting element are quite important. The spectrum of the light has to fall within a predetermined range, such that the reflected image light can properly reproduce the color of the image of a scanned document, and the image sensor can capture the correct image. The intensity of the reflected image light has to be sufficient enough for the image sensor to correctly capture image. In addition, the scanning light intensity has to be uniformly distributed to avoid the brightness non-uniformity on the document, so as to the reflected image light can be uniformly for the image sensor to correctly capture the image. As the image sensor is elongated and the image sensor scans the document through a slit to capture the entire image of the document, the ideal light emitting element is a linear light source. Conventionally, a cold cathode fluorescent lamp (CCFL) is usually used as the light emitting element to serve as a linear light source with uniformly distributed light intensity, and to provide an ideal white light. However, the CCFL has some disadvantages. First, the CCFL has a high operating voltage and a higher discharge voltage to activate the CCFL, so a high voltage driving circuit is required to provide a high voltage to activate and drive the CCFL, thus causing the increase of the cost of the scanning apparatus. Second, it is required to wait a period of time for the intensity of the emitted light becoming stable after the CCFL is activated. That is to say, the scanning apparatus using the CCFL after being started is required to wait a period of time for warming up, and then performs operation. Third, the intensity of the light emitted by the CCFL is greatly influenced by temperature. If the temperature of the CCFL increases after the scanning apparatus performs uninterrupted operation, the intensity of the emitted light is also changed with the change of the temperature, and even the spectrum is shifted, such that the emitted light is not the ideal white light anymore, and the image scanning quality under the uninterrupted operation of the scanning apparatus is inconsistent.

In addition to the CCFLs, LEDs also emit the ideal white light, so that the LEDs can be applied in the scanning apparatus to serve as the light emitting element for providing the scanning light. The LEDs are not limited to white LEDs capable of emitting the ideal white light. For example, in R.O.C Taiwan patent TW518877, the scanning apparatus does not apply white LED, but to use a monochrome image sensor to capture the image of different colors in a sequence of red, green, and blue lights, and then combine them into a color image, thereby solving the problem of high costs of the white LED and the color image sensor.

However, LEDs are point light sources, the emitted light diverges in a conical space, and the light intensity reduces with the increase of distance from the point light sources. If it is intended to cover the entire scanning area, the LEDs have to be arranged in a long array to emit light onto the entire scanning area. However, the area between two neighboring LEDs in the LED array only generates a weak light intensity depending on the scattering effect of the air. Therefore, if the LED array is directly used to emit the scanning light, the intensity of the light on the scanning area may be inconsistent. The solution for overcoming the problem of the inconsistent light intensity is not provided in the TW518877.

In order to solve the problem that the LEDs cannot provide the linear light source, the conventional method uses light guide elements such as prisms, cylindrical lenses, or transparent columns. The LEDs emit light onto two ends of a light guide element. Then, the light is uniformly projected from the lateral side of the light guide element because of the guiding and refracting light properties of the light guide element. For example, in R.O.C Taiwan patent TW549768 and I253840, a design utilizing the light guide element is provided, in which the LEDs become the linear light source. But, such a design of the light guide element has the disadvantage that the intensity of the light decays rapidly when the light travels in the light guide element, so the length of the light guide element is limited, resulting in that a width of the scanned document cannot be easily increased. In addition, a temperature due to heat generated during the operation of the LED causes degradation of the material of the light guide element, and thus the material used to be transparent becomes nontransparent or exhibits color. Therefore, the light guide element can not guide light anymore. Accordingly, the design adopting the light guide element cannot effectively solve the problem of using the LED to provide the scanning light source.

SUMMARY OF THE INVENTION

In view of the aforementioned problem, the objective of the present invention is to provide a scanning apparatus, to solve the problem that the light intensity cannot be uniformly distributed when a point light sources are used as a scanning light source.

In order to achieve the above objective, the present invention provides a scanning apparatus for scanning a document. The scanning apparatus includes a housing, at least one reflecting plate, a substrate, a plurality of point light sources, and an image sensor. The housing has a slit formed on a top surface thereof, and the reflecting plate is disposed in the housing to face the slit, wherein one edge of the reflecting plate extends on an edge of the slit. The substrate is disposed in the housing and fixed on the opposite edge of the reflecting plate. The point light sources are fixed on the substrate, and are arranged in one or more rows and spaced from each other an interval along a direction parallel to the slit. Each point light source emits a scanning light onto the reflecting plate, thereby the scanning light is reflected from the reflecting plate onto the document through the slit. Then the scanning light is reflected by the document to form an image light that enters the housing through the slit. The image sensor is disposed in the housing for receiving the image light reflected by the document and converting the image light into an image data.

The advantage of present invention is that uniform light intensity is provided by the point light sources such as LEDs without using additional elements. The point light sources are used to replace the linear light source such as the CCFL, thus effectively solving the problem that the manufacturing cost of the CCFL is high and the CCFL cannot be easily operated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the objective, construction, feature, function of the present invention apparent, the detailed description is given below in accompanying with the embodiments.

Figure 1A:
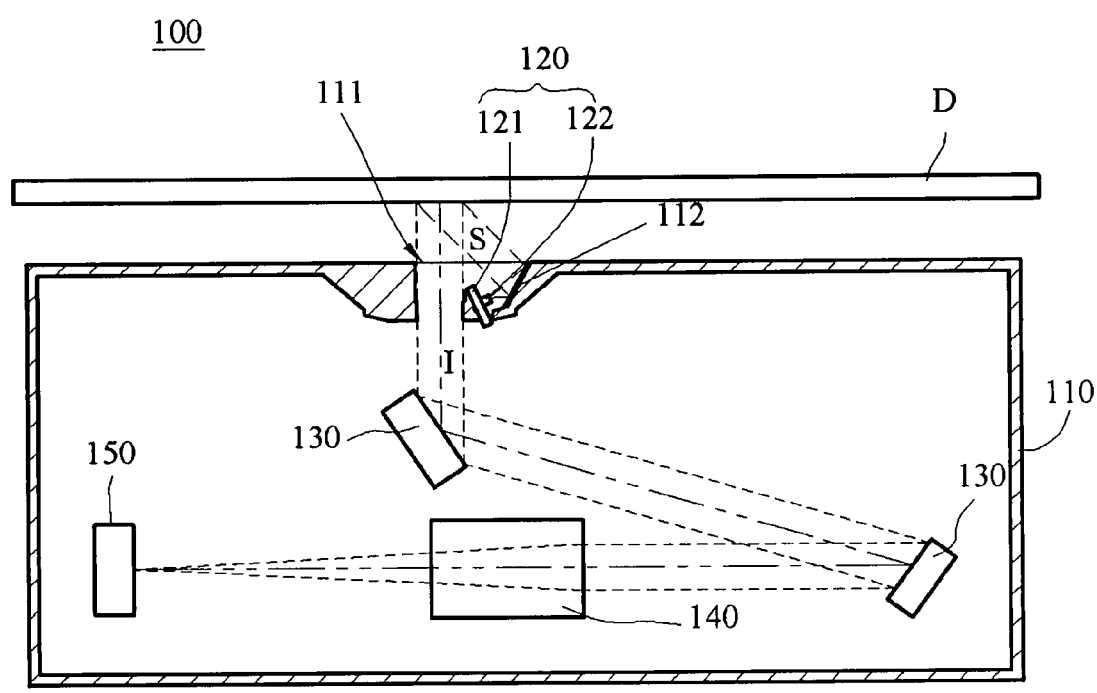
FIG. 1A is a cross-sectional view of a first embodiment of the present invention.
Figure 1B:
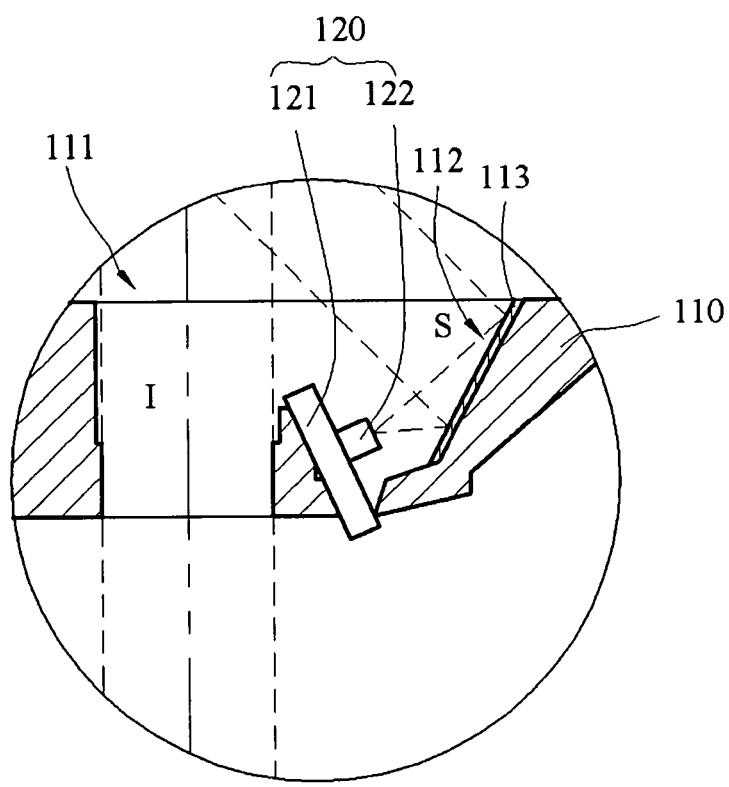
FIG. 1B is a partial enlarged view of FIG. 1A.

Referring to FIGS. 1A and 1B, a scanning apparatus 100 of a first embodiment of the present invention is shown. The scanning apparatus 100 is provided for scanning a document D and converting the image of the document D into image data. The scanning apparatus 100 includes a housing 110, a reflecting plate 112, a light emitting element 120, one or more reflecting mirrors 130, a focusing element 140, and an image sensor 150. The housing 110 has a slit 111 formed on a top surface thereof for the light to pass through. The reflecting plate 112 is disposed in the housing 110 to face the slit 111, wherein one edge of the reflecting plate 112 extends from an edge of the slit 111. A reflective layer 113 is formed on the reflecting plate 112 by means of coating or adhering, for adding reflectivity into the reflecting plate 112. Thus the light emitted onto the reflecting plate 112 is reflected; thereby project the light outside the housing 110 through the slit 111. The reflecting plate 112 can be planer for directly reflecting the light, or provided with a concave curved surface for focusing the light at a predetermined position outside the housing 110.

Figure 1C:
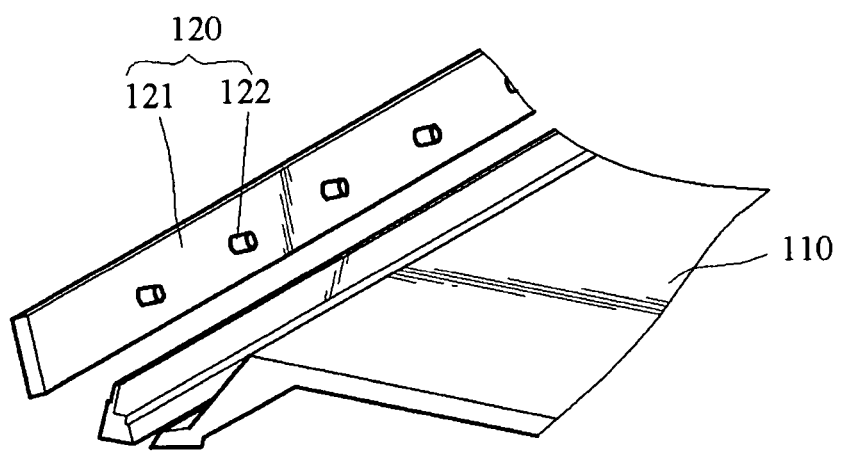
FIG. 1C is an exploded view of a part of the components in the first embodiment of the present invention.

Referring to FIGS. 1A, 1B, and 1C, the light emitting element 120 includes a substrate 121 and a plurality of point light sources 122. The substrate 121 is disposed in the housing 110 and fixed on the opposite edge of the reflecting plate 112, wherein the substrate 121 faces the reflecting plate 112 and has an angle with respect to the reflecting plate 112. The point light sources 122 are disposed on the substrate 121, and are arranged in a row and spaced from each other an interval along a direction parallel to the slit 111, as shown in FIG. 1C. The point light sources 122 can also be arranged in a plurality of rows, and the point light sources 122 in each row are staggered from that in the neighboring row. The point light source 122 can be LEDs and bulbs that generate light in a point, for emitting a scanning light S onto the reflecting plate 112. The scanning light S emitted onto the reflecting plate 112 is reflected and projected outside the housing 110 through the slit 111. After passing through the slit 111, the scanning light S is projected onto the document D, then the scanning light S is reflected by the document D to form an image light I according to the image on the surface of the document D, and sequentially the image light I enters the housing 110 through the slit 111.

The reflecting mirrors 130 are disposed in the housing 110, for reflecting the image light I to change the traveling direction of the image light I, such that the image light I travels towards the image sensor 150. In addition to changing the traveling direction of the image light I, another function of the reflecting mirror 130 is to extend the length of the light path of the image light I, so as to focus the image light I by the focusing element 140. The number of the reflecting mirrors 130 can be one or more than one depending on the times required for reflecting image light I to change the direction and the length required of the light path of the image light I. At least one reflecting mirror 130 is located below the slit 111, such that the image light I is projected onto the reflecting mirror 130 and reflected after passing through the slit 111.

The focusing element 140 and the image sensor 150 are disposed in the housing 110 for receiving the image light I reflected by the document D. The positions of the focusing element 140 and the image sensor 150 are determined by the size of the interior of the housing 110 and the configuration of the reflecting mirrors 130.

The focusing element 140 can be a convex lens, a cylindrical lens, or a lens set composed of a plurality of lenses. The focusing element 140 is located ahead of the image sensor 150. After the image light I being projected to the focusing element 140, the focusing element 140 focuses the image light I on the image sensor 150, such that the image sensor 150 receives the focused image light I and then converts the image light I into the image data. The image sensor 150 may be disposed anywhere in the housing 110 to fit the light path of the image light I. The image sensor 150 is a charge coupled device (CCD), so the image light requires a longer light path for focusing. The CCD can also be replaced by a contact image sensor (CIS), thus saving the focusing procedure and the long light path required for focusing. That is, the reflecting mirror 130 and the focusing element 140 can be removed.

Figure 2:
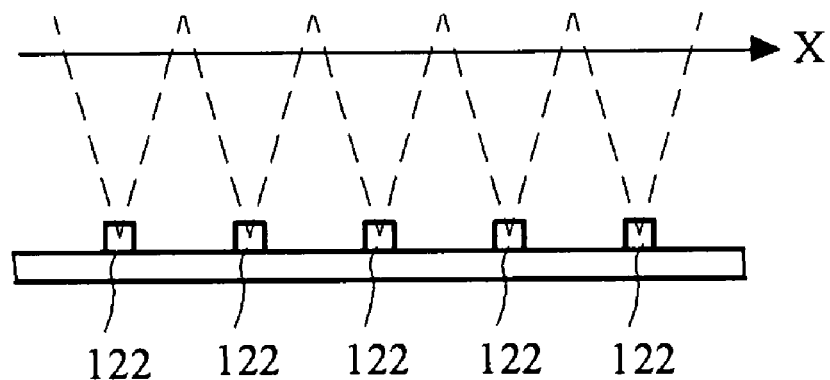
FIG. 2 is a schematic view of a plurality of point light sources arranged in a row and spaced from each other an interval when emitting light in the present invention.
Figure 3:
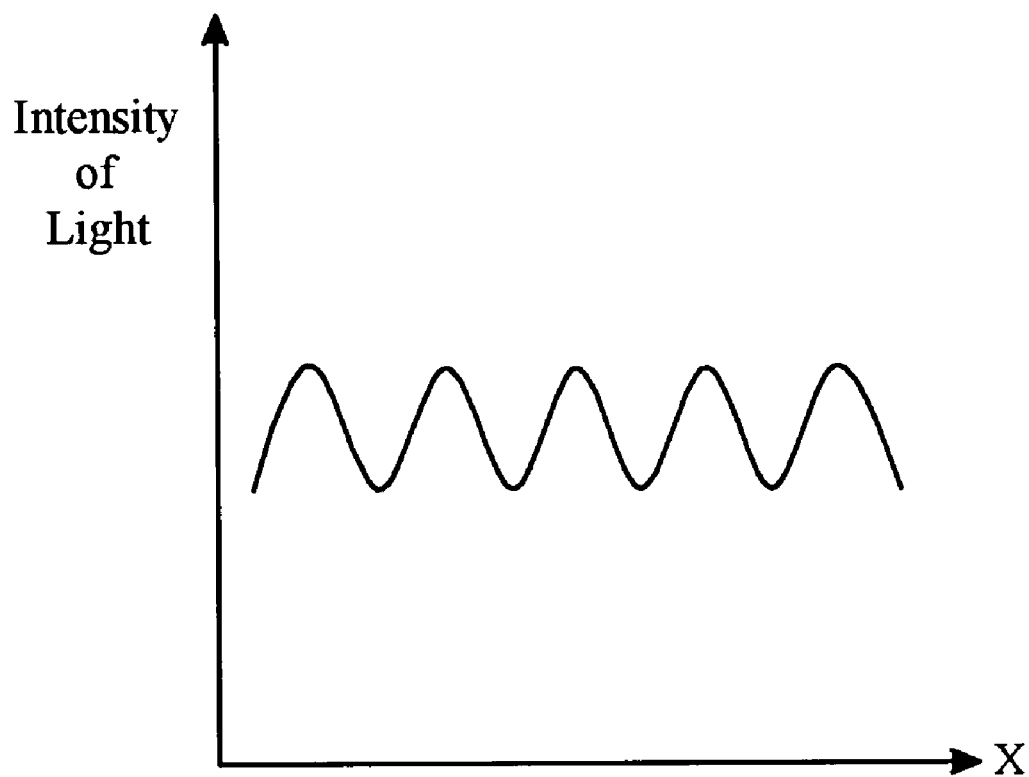
FIG. 3 is a diagram of the distribution of the intensity of the light emitted by the point light sources arranged in a row and spaced from each other an interval in the present invention.

Referring to FIGS. 2 and 3, a schematic view of the plurality of point light sources 122 arranged in a row and spaced from each other an interval when emitting light and a diagram of the light intensity distribution are shown. The light emitted by the point light source 122 diverges in a conical space, and the light intensity reduces with the increase of the distance from the point light sources 122. The area between two neighboring point light sources 122 only generates the weak light intensity depending on the scattering effect of the air. Therefore, as shown in the diagram of the light intensity distribution of the in FIG. 3, if the plurality of point light sources 122 directly emit the scanning light S onto the document D, the light intensity received by the surface of document D may be non-uniform and the diagram of the intensity distributed may be in the form of sine wave, such that the quality of image data generated by the image sensor may have the problem of brightness non-uniformity. To solve the problem, the approach is to elongate the distance between the point light sources 122 and the document, or to increase the number of the point light sources 122, to reduce the interval between the point light sources 122, such that the scanning light S emitted by each point light source 122 is staggered to uniformly distribute the light intensity. However, the extended distance between the point light sources 122 and the document will reduce the average light intensity of the scanning light S and increase the volume of the scanning apparatus. The increase of the number of the point light sources 122 and the reducing of the interval between the point light sources 122 will cause the increase of the power consumption and heat generation. And the increase of the heat generation of the point light sources 122 may also result in the problem of heat dissipation.

Figure 4:
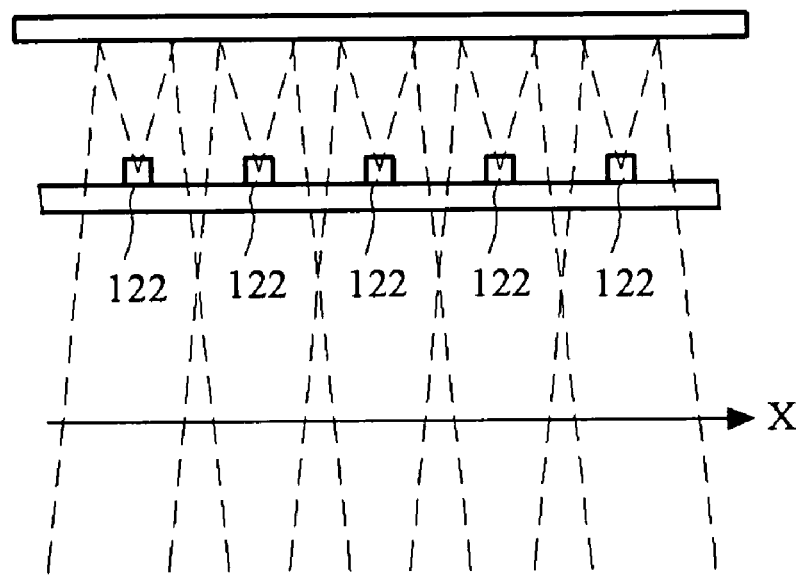
FIG. 4 is a schematic view of the light emitted by the plurality of point light sources arranged in a row and spaced from each other an interval, and reflected by the reflecting plate of the present invention.
Figure 5:
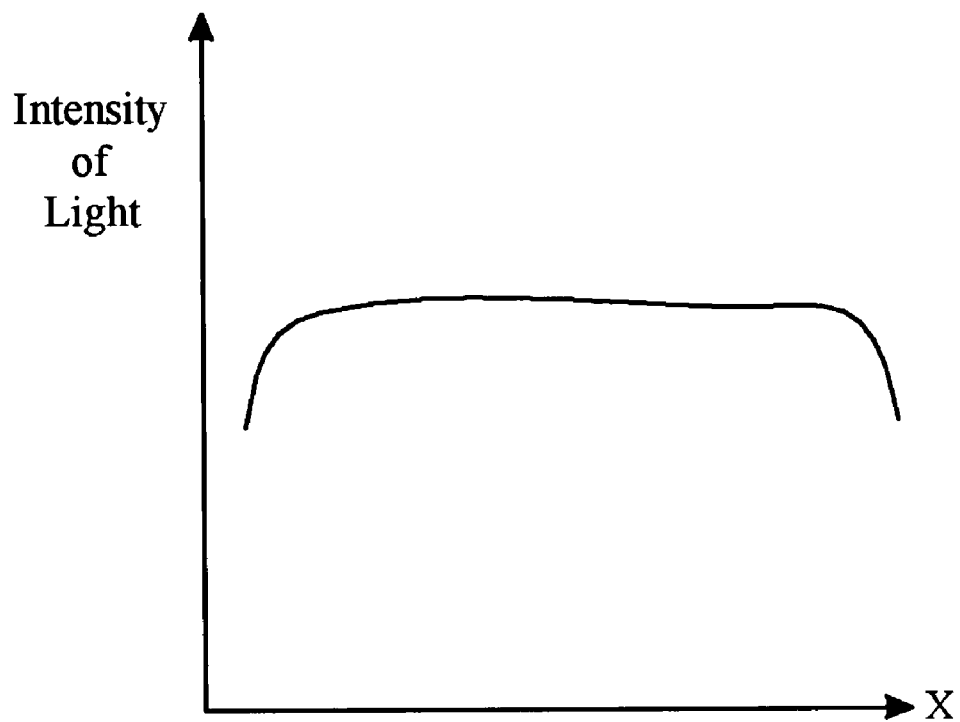
FIG. 5 is a diagram of the distribution of the intensity of the light emitted by the point light sources arranged in a row and spaced from each other an interval, and reflected by the reflecting plate of the present invention.

Referring to FIGS. 4 and 5, in the first embodiment of the present invention, after the reflecting plate 112 reflects the scanning light S emitted by the point light sources 122, the scanning lights S emitted by each point light source 122 are staggered, thus producing the mixing effect by diffusion and scattering, such that the scanning light S reflected by the reflecting plate 112 becomes a light similarly to that emitted by a linear light source and has uniform light intensity distribution, as shown in FIG. 5. As compared with the conventional CCFL, the point light sources 122 no matter in the form of LEDs or bulbs have the advantages of low power consumption, low operating voltage, quick activation, and low manufacturing cost. Therefore, the present invention due to the superior performance in the activation time, manufacturing cost, and power consumption are better than the scanning apparatus adopting the CCFL as the scanning light source.

Figure 6:
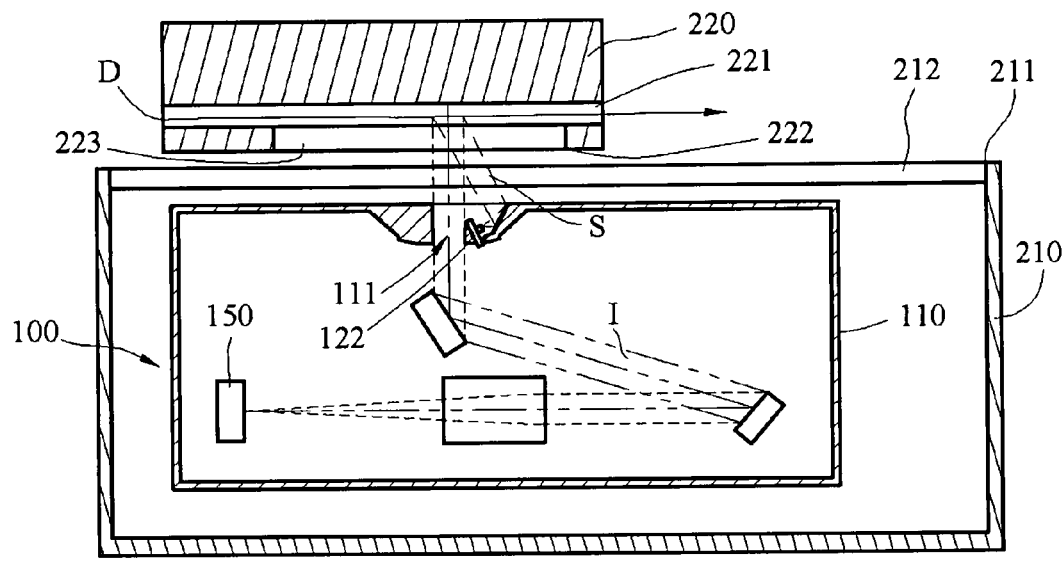
FIG. 6 is a cross-sectional view of the present invention applied in a sheet fed scanner.

Referring to FIG. 6, the first embodiment of the present invention is applied in a sheet-fed scanner 200. The sheet-fed scanner 200 has at least one body 210 and a paper feeding apparatus 220. The scanning apparatus 100 is disposed in the body 210 and is located below a window 211 of the body 210, such that the slit 111 of the housing 110 corresponds to the window 211 of the body 210, and the window 211 is covered by a transparent partition plate 212. A feeding track 221 is disposed in the paper feeding apparatus 220 for transferring the document D in the feeding track 221. The paper feeding apparatus 220 is disposed on the body 210, and is covered on the window 211. An opening 222 is formed on a side of the paper feeding apparatus 220 facing the body 210, so as to expose the feeding track 221, and the opening 222 is covered by an auxiliary transparent partition plate 223. The opening 222 is overlapped with and corresponding to the window 211, such that when the document D travels in the feeding track 221 and passes above the window 211. The scanning light S emitted by the point light sources 122 of the scanning apparatus 100 will pass through the slit 111, the transparent partition plate 212, and the auxiliary transparent partition plate 223, then pass through the opening 222 to be projected on the document D. And then the scanning light S is reflected by the surface of the document D to form the image light I. The image light I enters the scanning apparatus 100, so as to be converted by the image sensor 150 into the image data.

Figure 7:
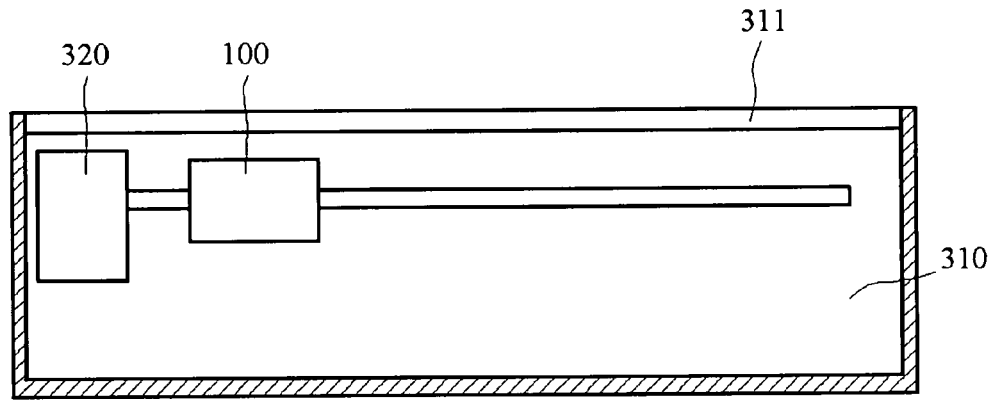
FIG. 7 is a cross-sectional view of the present invention applied in a flatbed scanner.

Referring to FIG. 7, the first embodiment of the present invention is applied in a flatbed scanner 300. The flatbed scanner 300 has at least one body 310 and a conveying device 320. The scanning apparatus 100 is disposed in the body 310 and is located below a transparent partition plate 311 of the body 310, such that the slit 111 of the housing 110 faces the transparent partition plate 311 of the body 310. The conveying device 320 is disposed in the body 310 for conveying the scanning apparatus 310 to move relative to the body 310. Therefore, a document placed flatly on the transparent partition plate 311 is scanned by the scanning apparatus 310, and then the image of the document is converted into the image data.

Figure 8A:
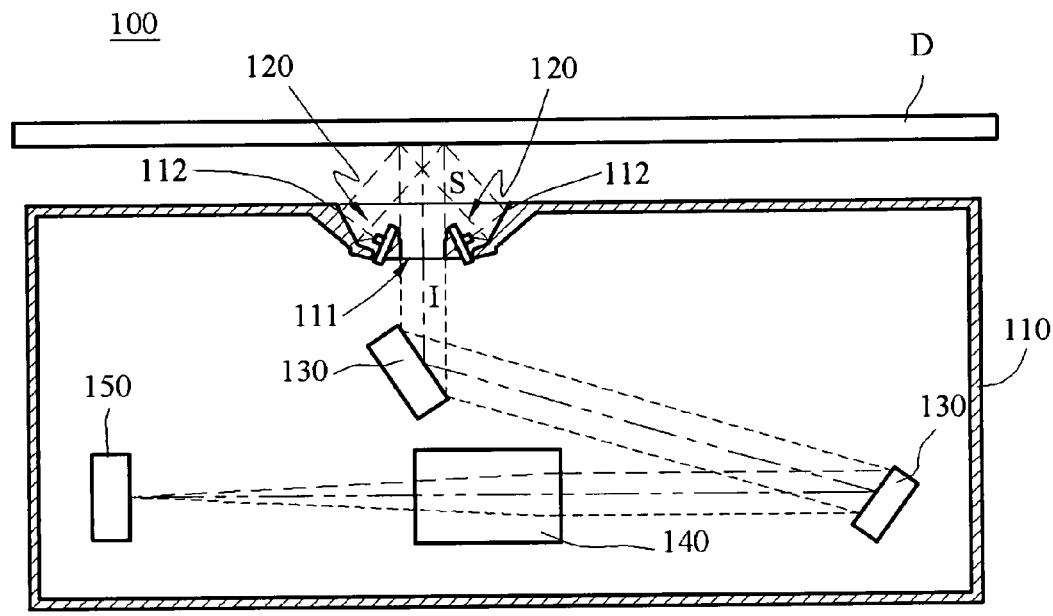
FIG. 8A is a cross-sectional view of a second embodiment of the present invention.
Figure 8B:
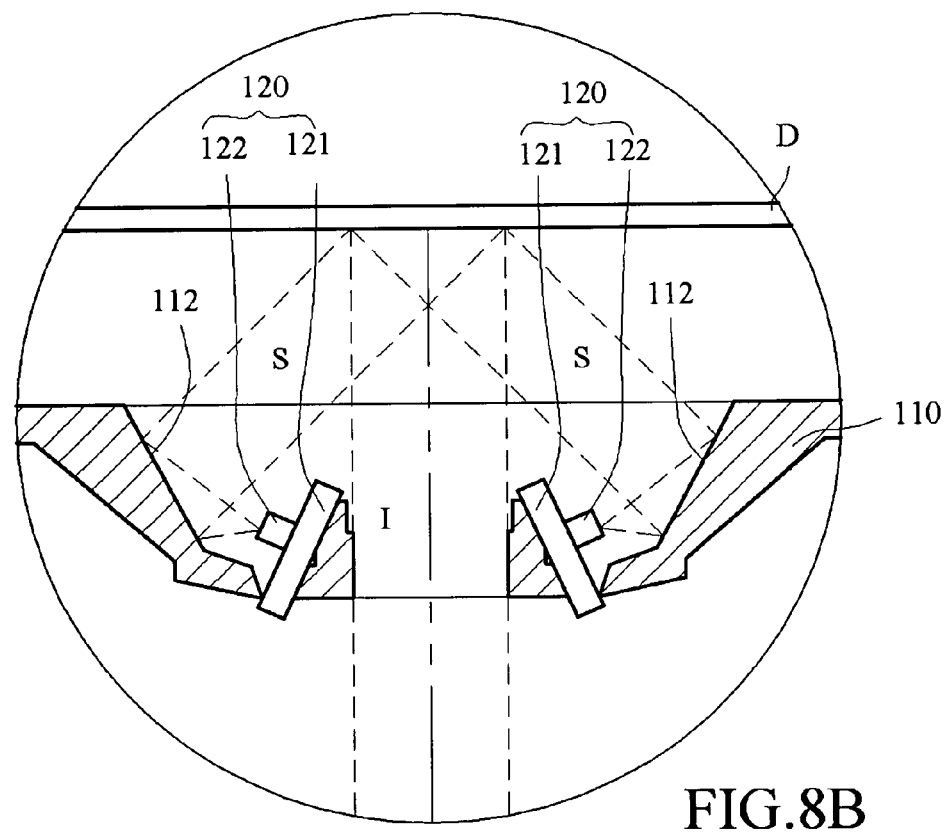
FIG. 8B is a partial enlarged view of FIG. 8A.

Referring to FIGS. 8A and 8B, a cross-sectional view of a second embodiment of the present invention and a partial enlarged view of FIG. 8A are shown. The scanning apparatus 100 of the second embodiment includes a housing 110, two reflecting plates 112, two light emitting elements 120, one or more reflecting mirrors 130, a focusing element 140, and an image sensor 150. The housing 110 has a slit 111 formed on a top surface thereof for the light to pass through. Two reflecting plates 112 are disposed in the housing 110 to face the slit 111, wherein both reflecting plates 112 have one edge extending from two opposite edges of the slit 111 respectively. Thus the light from the two light emitting elements 120 emitted onto the two reflecting plates 112 is reflected outside the housing 110 through the slit 111.

Referring to FIGS. 8A and 8B, each light emitting element 120 includes a substrate 121 and a plurality of point light sources 122. Each substrate 121 is disposed on the opposite edge of one of the two reflecting plates 112, such that the two substrates 121 face the slit 111 respectively and has an angle with respect to the corresponding reflecting plate 112. The point light sources 122 are disposed on the substrate 121, and are arranged in a row or rows and spaced from each other an interval along the direction parallel to the slit 111, wherein the point light sources 122 are provided for emitting a scanning light S onto the reflecting plate 112. The scanning light S reflected from the reflecting plate 112 is projected outside the housing 110 through the slit 111. After passing through the slit 111, the scanning light S is projected on the surface of document D. Then, the scanning light S is reflected by the document D to form an image light I according to the image of the surface of the document D, and then enters the housing 110 through the slit 111.

A reflecting mirror 130, a focusing element 140, and an image sensor 150 are disposed in the housing 110, wherein the reflecting mirror 130 is provided for reflecting the image light I to change the traveling direction of the image light I, such that the image light I travels towards the image sensor 150. The focusing element 140 is located ahead of the image sensor 150, such that the image light I after being incident on the focusing element 140 is focused on the image sensor 150, thus the image sensor 150 receives the focused image light I and then converts it into the image data.

Figure 9A:
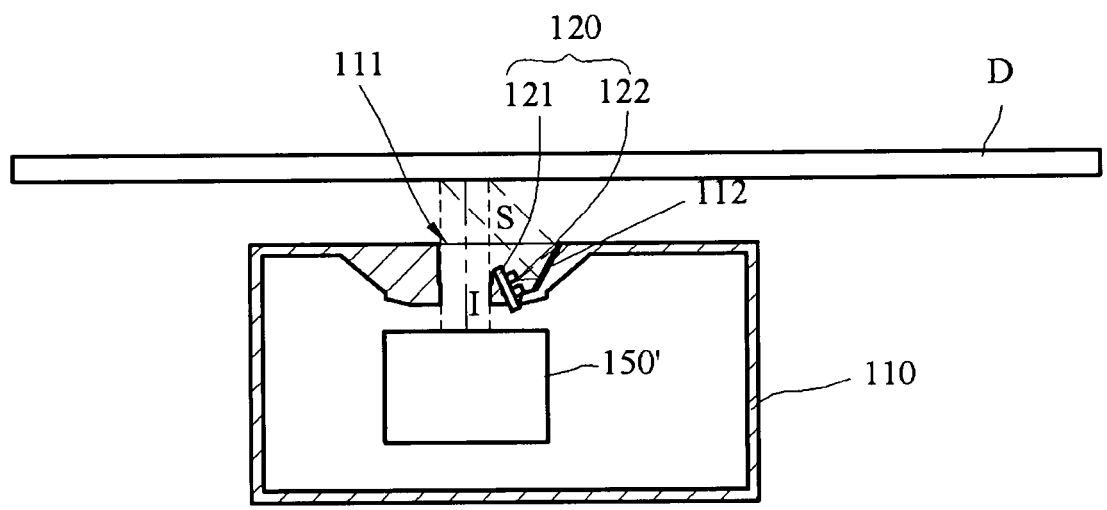
FIG. 9A is a cross-sectional view of a third embodiment of the present invention.
Figure 9B:
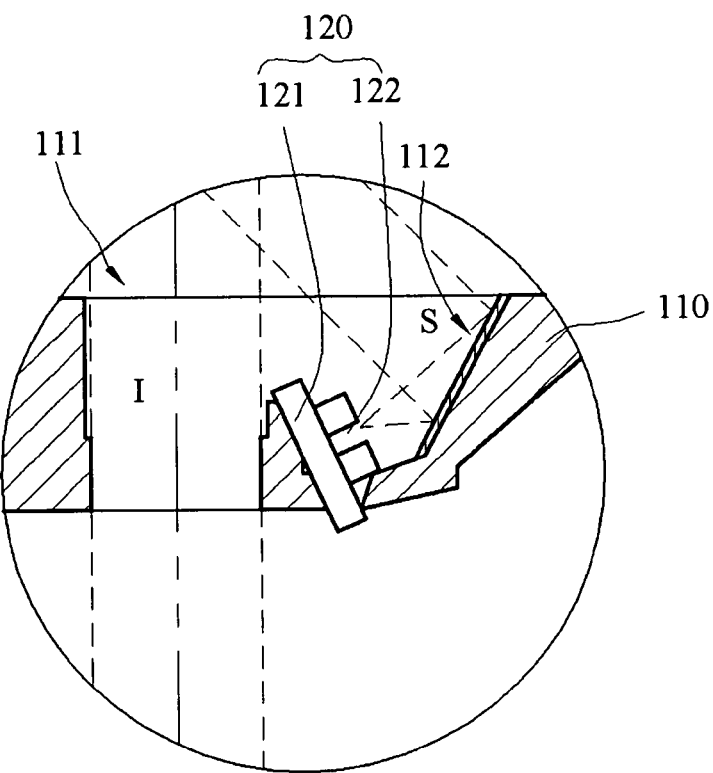
FIG. 9B is a partial enlarged view of FIG. 9A.
Figure 9C:
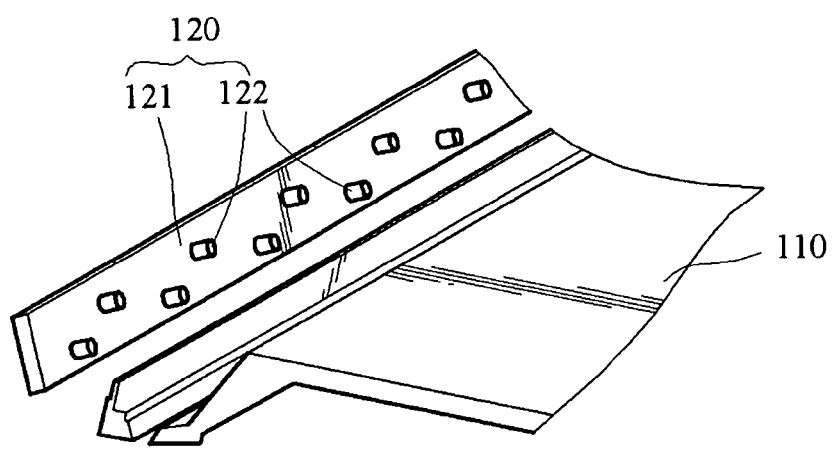
FIG. 9C is an exploded view of a part of the components in the third embodiment of the present invention.

Referring to FIGS. 9A, 9B, and 9C, a cross-sectional view of a third embodiment of the present invention, a partial enlarged view of FIG. 9A, and an exploded view of a part of the components in the third embodiment are shown. The scanning apparatus 100 of the third embodiment includes a housing 110, a reflecting plate 112, a light emitting element 120, and an image sensor 150'. The housing 110 has a slit 111 formed on the top surface thereof for the light to pass through. The reflecting plate 112 is disposed in the housing 110 and faces the slit 111, wherein one edge of the reflecting plate 112 extends on an edge of the slit 111, such that the light emitted from the light emitting element 120 is projected on the reflecting plate 112 is reflected outside the housing 110 through the slit 111.

The light emitting element 120 includes a substrate 121 and a plurality of point light sources 122. The substrate 121 is disposed in the housing 110 and on the opposite edge of the reflecting plate 112, wherein the substrate 121 faces the reflecting plate 112 and has an angle with to the reflecting plate 112. The point light sources 122 are disposed on the substrate 121, and are arranged in a plurality of rows and spaced from each other an interval along the direction parallel to the slit 111, as shown in FIGS. 9B and 9C. The point light sources 122 in each row are staggered from that in the neighboring row. Similarly, the point light sources 122 may be arranged in a row. The point light sources 122 are provided for emitting a scanning light S onto the reflecting plate 112, and the scanning light S reflected from the reflecting plate 112 is projected outside the housing 110 through the slit 111. After passing through the slit 111, the scanning light S is projected on the document D. Then, the scanning light S is reflected by the surface of the document D to form an image light I according to the image of the document D, and sequentially the image light I enters the housing 110 through the slit 111. The image sensor 150' is a CIS, which is capable of directly receiving the image light I and converting it into the image data. The length of the light path required by the CIS is smaller than that required by the CCD, so the image sensor 150' can be disposed in the housing 110 and located below the slit 111 for directly receiving the image light I reflected from the document D and converting it to the image data. However, it should be noted that the third embodiment of the present invention can also have two reflecting plates 112 and two light emitting elements 120. Two reflecting plates 112 respectively face the slit 111 for the light to be projected onto the reflecting plates 112 to be reflected outside the housing 110 through the slit 111.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scanning apparatus, for scanning a document, comprising:
    a housing, having a slit formed on a top surface thereof, the housing having two reflecting plates respectively extending on two opposite edges of the slit and facing the slit;
    two light emitting elements respectively disposed on the corresponding edges of the pair of reflecting plates and respectively emitting a scanning light onto each reflecting plate, each light emitting element including:
        a substrate, disposed in the housing and fixed on an opposite edge of a respective reflecting plate, wherein the substrate faces the respective reflecting plate and has an angle with respect to the respective reflecting plate; and
        a plurality of point light sources, disposed on the substrate, wherein each point light source emits a scanning light onto the respective reflecting plate, thereby projecting the scanning light reflected from the respective reflecting plate onto the document through the slit, and then the scanning light is reflected from the document to form an image light that enters the housing through the slit; and
    an image sensor, disposed in the housing for receiving the image light reflected from the document and converting the image light into image data.

2. The scanning apparatus as claimed in claim 1, wherein a reflective layer is formed on each reflecting plate.

3. The scanning apparatus as claimed in claim 1, wherein each reflecting plate is a plane or a concave curved surface.

4. The scanning apparatus as claimed in claim 1, wherein each point light source has a light emitting diode or a bulb.

5. The scanning apparatus as claimed in claim 1, further comprising a focusing element disposed in the housing and located ahead of the image sensor for focusing the image light on the image sensor.

6. The scanning apparatus as claimed in claim 1, further comprising at least one reflecting mirror disposed in the housing, for reflecting the image light to change a light path of the image light, such that the image light travels towards the image sensor and a length of the light path of the image light is extended.

7. The scanning apparatus as claimed in claim 6, wherein the image sensor is a charge coupled device.

8. The scanning apparatus as claimed in claim 1, wherein the image sensor is a contact image sensor.

9. The scanning apparatus as claimed in claim 8, wherein the contact image sensor is disposed in the housing, and located below the slit for directly receiving the image light reflected by the document and converting the image light into the image data.

10. The scanning apparatus as claimed in claim 1, wherein the point light sources are arranged in a row and spaced from each other an interval along a direction parallel to the slit.

11. The scanning apparatus as claimed in claim 1, wherein the point light sources are arranged in a plurality of rows, and the point light sources in each row are spaced from each other an interval along a direction parallel to the slit.

12. The scanning apparatus as claimed in claim 11, wherein the point light sources in each row are staggered from that in the neighboring row.

* * * * *